Oct. 18, 1927.
E. R. BURTNETT
1,645,795
INTERNAL COMBUSTION ENGINE
Filed Sept. 25. 1924
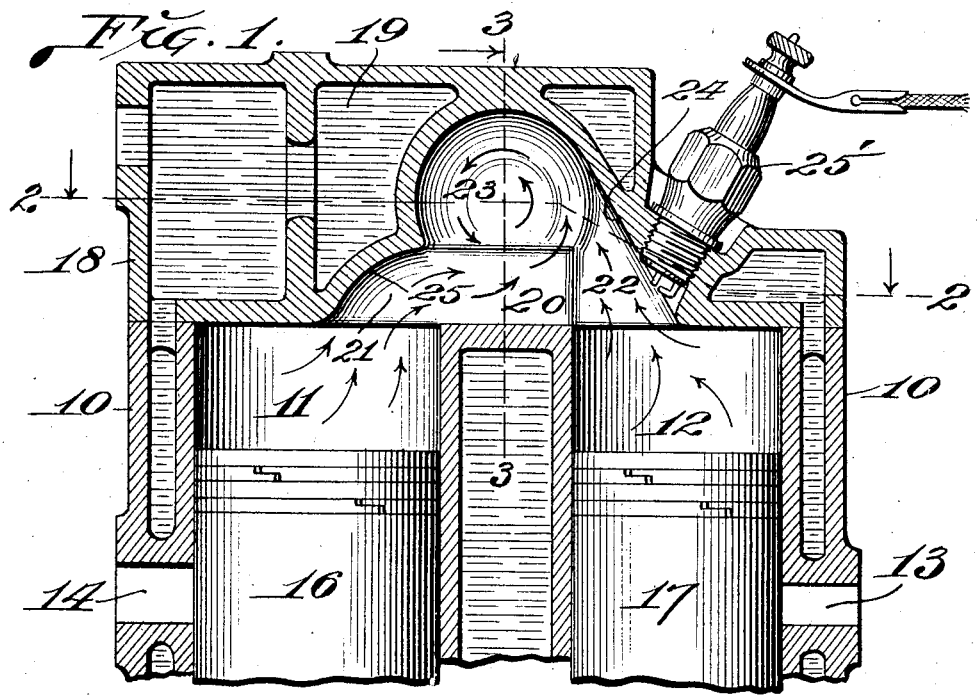
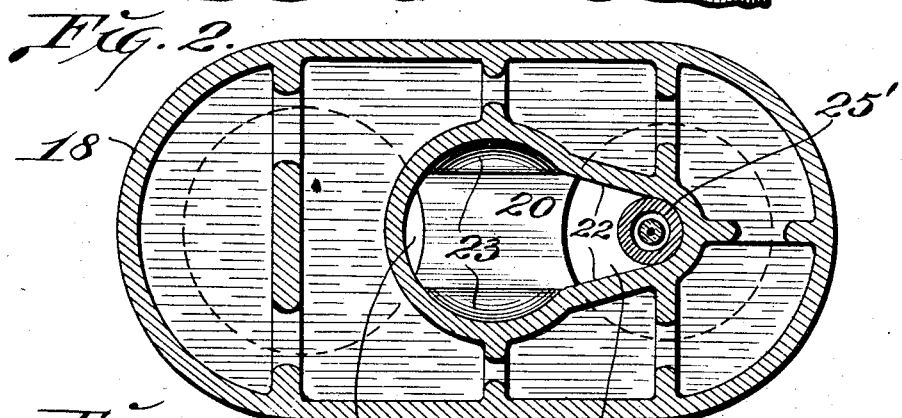
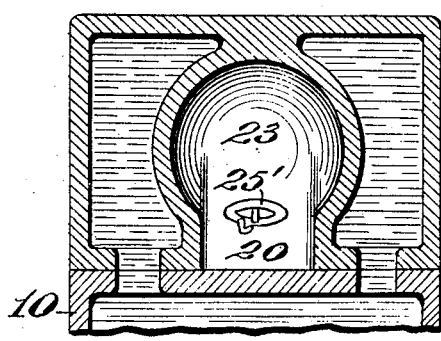
INVENTOR,
Everett R. Burtnett
By Martin O. Smith
Atty.

Patented Oct. 18, 1927.

1,645,795

UNITED STATES PATENT OFFICE.

EVERETT R. BURTNETT, OF LOS ANGELES, CALIFORNIA, ASSIGNOR, BY DIRECT AND MESNE ASSIGNMENTS, TO THE AUTOMOTIVE VALVES CO., OF LOS ANGELES, CALIFORNIA, A VOLUNTARY TRUST.

INTERNAL-COMBUSTION ENGINE.

Application filed September 25, 1924. Serial No. 739,914.

My invention relates generally to internal combustion engines, and more particularly to the specific type of two stroke cycle engine disclosed in my co-pending application for U. S. Letters Patent filed July 31, 1924, Serial No. 729,300, the principal object of my present invention being to generally improve upon and simplify the construction of the engine disclosed in my application aforesaid and, further, to provide in a two stroke cycle internal combustion engine a combustion chamber clearance space in which the charge, during compression and after the piston has completed its inward or compression stroke, to compress the gaseous charge, will be greatly agitated and caused to whirl with a comparatively rapid movement within said clearance space or pocket that is common to the combustion chambers within the engine cylinders.

It is understood by those familiar with and skilled in the art of internal combustion engine design that the ratio of residual gases in quantity, to the quantity of fresh gaseous fuel comprising the combustion charge, influences to a considerable degree the temperatures during charge combustion, and it is an accepted fact by those who have made scientific search for the cause of detonation that the initial temperatures and pressures of combustion are the controlling factors of detonation.

Therefore, it is one of the principal objects of my invention to provide a common combustion chamber for an internal combustion engine having two of its combustion cylinders joined by a common compression and combustion clearance chamber, the piston of one cylinder functioning to uncover fresh gaseous fuel charge inlet ports that are formed in the wall of said cylinder and the piston within the other of the two cylinders functioning by uncovering ports that are formed in the wall of said second cylinder and which serve as exhaust ports to permit the exit or outlet of exhaust gases or products of combustion.

My invention contemplates a structure designed so that when the engine is operated, with full load and with maximum throttle, the quantity of the fresh gaseous fuel charge admitted to the connected combustion cylinders will be such that it will only fill the one cylinder to which it is inducted or first admitted. Under such conditions, the scavenging of the burnt gases or residual products of combustion in volume by the induction of fresh gaseous fuel charge to the dual combustion chambers will be in direct ratio to the volume of admitted fresh gaseous fuel. Since the maximum fresh fuel induction volume is only sufficient to fill one cylinder, a quantity of residual gases or burnt products of combustion, equal in volume to the displacement of the second cylinder and the common compression clearance pocket, will be retained in the dual cylinder combustion chamber.

Having thus established a ratio between the volume of residual gases and the maximum fresh gaseous fuel charge induction volume, I propose to form the compression clearance pocket so as to effect a very thorough mixture of the residual gases and the charge of fresh gaseous fuel during the compression stroke of the pistons within the cylinder combustion chambers.

It is recognized that, where the increase of quantity of residual gases or inert volume is sufficient, when mixed with the fresh gaseous fuel charge, the dilution will prevent regularity of firing while the engine is idling or operating with very light loads. Regularity of firing may be obtained by locating the charge ignition device at the throat of the clearance chamber directly over the cylinder chamber to which the fresh gaseous fuel charges are inducted, the presumption being that when a very small quantity of fresh gaseous fuel is inducted to the first cylinder through ports formed in the wall thereof and located so as to be uncovered as the piston passes outer dead center, that the admitted fresh gaseous fuel charge will remain in a stratum directly over the piston head. When the piston, with this gaseous fuel volume immediately over its head, reaches top or inner dead center, the fresh gaseous fuel charge will be the last to be forced into and through the throat of the chamber leading into the compression clearance pocket. It is at this time, or when the piston reaches top or inner dead center, that the ignition of the gaseous fuel charge should take place to secure maximum efficiency. The fresh undiluted gases lying directly over the piston head during the compression stroke and passing through the throat at the time the piston reaches inner dead center provide for the ignition of said fresh gaseous fuel charge as it passes through the throat and before said charge reaches the turbulence charge in the dome or upper portion of the clearance pocket or turbulence chamber.

With the foregoing and other objects in view, my invention consists in the features of construction and combination and arrangement of parts hereinafter more fully described and claimed, reference being had to the accompanying drawings, in which Figure 1 is a longitudinal vertical section taken through the upper portion of an internal combustion engine cylinder block, said block being provided with a turbulence head constructed in accordance with my invention;

Figure 2 is a horizontal section taken on the line 2—2 of Figure 1;

Figure 3 is a cross section taken on the line 3—3 of Figure 1.

Referring by numerals to the accompanying drawings, which illustrate a practical embodiment of my invention, 10 designates in engine cylinder block, 11 and 12 a pair of combustion chambers within said block. 13 gaseous fuel inlet ports that are formed in the wall of the block and which lead into combustion chamber 12, and 14 exhaust ports that are formed in the wall of the cylinder block and lead from combustion chamber 11. The inlet ports 13 and exhaust ports 14 are located so that they are uncovered and wholly open only when the pistons 16 and 17 that operate respectively within combustion chambers 11 and 12 are at their low or outer dead centers. Secured in any suitable manner to the head end of block 10 is a head block 18 that is provided with a chamber 19 or a series of connected chambers through which may be circulated a fluid cooling medium such as water. Formed in the under side of head 18 is a pocket or chamber 20 that connects and provides a common clearance space for combustion chambers 11 and 12, and the end portions of this common clearance space communicate directly with combustion chambers 11 and 12 by downwardly opening throat-like chambers 21 and 22, respectively.

Formed in head 18 directly above the common clearance space or chamber 20 is a substantially spherical chamber 23 that performs the functions of a turbulence chamber, and the latter is in direct communication with clearance space 20 and with the throats 21 and 22. The bottom surface 24 of throat 22 is inclined, and the upper portion thereof unites with and forms a continuation of the curved surface of turbulence chamber 23, while the bottom surface 25 of throat 21 is curved and meets the lower portion of the inner surface of turbulence chamber 23 in a plane practically coincident with the upper portion of common clearance space 20. Thus the ends of the throats 21 and 22 that communicate with turbulence chamber 23 and space 20 are disposed substantially tangentially to the inner surface of turbulence chamber 23, and, consequently, tend to impart circular motion to the fresh gaseous fuel charge and inert residual products of combustion that enter said turbulence chamber during the compression stroke of the pistons. Seated in head 18 is an ignition device, such as a spark plug 25', the same being located so that the inner ends of the electrodes thereof project into throat 22 just above the point where the same communicates with combustion chamber 12.

In the operation of my improved engine, pistons 16 and 17 in passing low or outer dead center uncover inlet ports 13 and exhaust ports 14, and as said ports are thus uncovered a charge of fresh gaseous fuel will enter port 13 and pass upwardly through combustion chamber 12. From said chamber 12 this gaseous fuel charge passes upwardly through throat 22 into the upper portion of the substantially spherical turbulence chamber 23 and by virtue of the shape of said tubulence chamber said fuel charge will be given a whirling circular motion simultaneously, with a similar result or action imparted to the residual products of combustion that are forced upward from combustion chamber 11 through throat 21, and from thence through common clearance chamber 20 into the turbulence chamber. This whirling mixing action or turbulence continues as pistons 16 and 17 continue their upward or compression movements, and as the pistons pass high center a spark is produced between the terminals of plug 25', thereby igniting the compressed gaseous fuel charge within chambers 20 and 23 and throats 21 and 22, and the rapid expansion following combustion of the ignited charge will act on the heads of the pistons to drive the latter downward on the power stroke.

As a result of the location of the spark plug at the lower end of throat 22, the spark for the ignition of the compressed gaseous fuel charge is produced at a point but a very slight distance above the upper surface of the head of piston 17 and within the stratum of practically undiluted fresh gaseous fuel that lies directly over the head of said piston while the same is moving upward on the compression stroke. By igniting the compressed gaseous fuel charge at this point or within the stratum of practically undiluted fresh gaseous fuel, positive ignition of the charge is assured and the flame propagation resulting from the ignition of the charge will travel at relatively high speed through the compressed gaseous fuel charge within chamber 23, and this action will be accelerated, due to the turbulence or rapid movement of the compressed charge within said chamber and the common clearance chamber 20. The igniting of the gaseous fuel charge at the lower end of the throat 22 is particularly effective when the engine is idling or operating with relatively light loads for under such conditions a stratum of undiluted gaseous fuel of substantial thickness lies directly against the head of piston 17 during its inward or compression stroke. Inasmuch as a substantial portion of the residual gases are mixed with the fresh gaseous fuel charge inducted into the combustion chambers of the engine, the relatively high temperatures during combustion will be materially decreased, thereby eliminating the undesirable results arising from detonation.

Obviously various minor changes in the form, size and construction of my improved engine may be made without departing from the spirit of my invention, the scope of which is set forth in the appended claims.

I claim as my invention:

1. An internal combustion engine having a pair of combustion chambers, one of which is provided with a gaseous fuel inlet port, the other chamber having an exhaust port, the head ends of which combustion chambers are connected by a common clearance space, that comprises a relatively narrow lower intermediate chamber, a substantially spherical upper chamber that is disposed immediately above the narrow lower chamber, a throat leading from one end of the narrow lower chamber downwardly to one of the combustion chambers and a throat leading from the opposite end of the narrow lower chamber and from the corresponding side of the spherical upper chamber downwardly to the other one of the two combustion chambers, and an ignition device projecting into said clearance space adjacent to the point where the same communicates with the combustion chamber having the gaseous fuel inlet port.

2. An internal combustion engine having a pair of combustion chambers, one of which is provided with a gaseous fuel inlet port and the other chamber having an exhaust port, a head closing said chambers, which head is provided with a common clearance space that comprises a relatively narrow lower intermediate chamber, a substantially spherical upper chamber that is disposed immediately above the narrow lower chamber, a throat leading from one end of the narrow lower chamber downwardly to one of the combustion chambers and a throat leading from the opposite end of the narrow lower chamber and from the corresponding side of the spherical upper chamber downwardly to the other one of the two combustion chambers, and an ignition device set in the head and projecting into the throat that communicates with the combustion chamber having the gaseous fuel inlet port.

3. An internal combustion engine having a pair of combustion chambers, one of which is provided with a gaseous fuel inlet port, the other chamber being provided with an exhaust port, a head closing said chamber, said head being provided with a clearance chamber that is common to the two combustion chambers, which clearance chamber includes a substantially spherical upper portion that functions as a turbulence chamber during compression of the gaseous fuel charge within said clearance chamber, said clearance chamber also including throat-like openings that establish communication between the turbulence chamber and the combustion chambers, and a relatively narrow lower central portion that communicates with the throat-like openings and the upper spherical portion, and an ignition device located in said head and projecting into the throat-like chamber that establishes communication between the turbulence chamber and the combustion chamber having the inlet port.

In testimony whereof I affix my signature.

EVERETT R. BURTNETT.